US012215545B2

(12) United States Patent
Vangberg-Brinkmann

(10) Patent No.: US 12,215,545 B2
(45) **Date of Patent: *Feb. 4, 2025**

(54) MOUNTING ELEMENT FOR MOUNTING AN ARCHITECTURAL COVERING BETWEEN OPPOSING MOUNTING SURFACES

(71) Applicant: Hunter Douglas Industries B.V., Rotterdam (NL)

(72) Inventor: Katharina Vangberg-Brinkmann, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,892

(22) Filed: Sep. 22, 2023

(65) Prior Publication Data

US 2024/0011352 A1 Jan. 11, 2024

Related U.S. Application Data

(63) Continuation of application No. 16/174,899, filed on Oct. 30, 2018, now Pat. No. 11,802,441.

(30) Foreign Application Priority Data

Nov. 3, 2017 (EP) .................................... 17199912

(51) Int. Cl.
*E06B 9/323* (2006.01)
*E06B 9/42* (2006.01)
(Continued)

(52) U.S. Cl.
CPC ................ *E06B 9/42* (2013.01); *E06B 9/323* (2013.01); *E06B 9/50* (2013.01); *E06B 2009/407* (2013.01)

(58) Field of Classification Search
CPC ... E06B 9/42; E06B 9/323; E06B 9/50; E06B 9/40; E06B 2009/407; E06B 9/17;
(Continued)

(56) References Cited

U.S. PATENT DOCUMENTS 2,509,521 A 5/1950 Pegram
3,110,506 A 11/1963 O'Brien
(Continued)

FOREIGN PATENT DOCUMENTS

DE 3326244 2/1985
EP 1936106 6/2008
(Continued)

OTHER PUBLICATIONS

European Search Report issued in corresponding Application No. 18204024.6 Dated Mar. 13, 2019 (6 pages).
(Continued)

*Primary Examiner* — Johnnie A. Shablack
*Assistant Examiner* — Jeremy C Ramsey
(74) *Attorney, Agent, or Firm* — Dority & Manning, P.A.

(57) ABSTRACT

A mounting element for mounting an architectural covering between two opposing mounting surfaces includes an elongate mounting member having a first end, a second end, and a guide surface. The mounting element also includes a telescopic extender arranged at one of the first end or the second end of the elongate mounting member, with the telescopic extending being operable between a retracted configuration and an extended configuration. The telescopic extender includes a slidable body to slide along the guide surface so as to lengthen the mounting element, and a locking member configured: i) to allow the slidable body to slide in the first translation direction, and ii) to prevent the slidable body from sliding in a second translation direction opposite the first translation direction. In addition, the tele-
(Continued)

scopic extending includes a release mechanism configured to cooperate with the locking member.

21 Claims, 7 Drawing Sheets

(51) Int. Cl.
*E06B 9/50* (2006.01)
*E06B 9/40* (2006.01)

(58) Field of Classification Search
CPC .......... F16C 3/03; F16B 7/14; F16B 12/2009; F16B 12/2027
See application file for complete search history.

(56) References Cited

U.S. PATENT DOCUMENTS

| | | | | |
|---|---|---|---|---|
| 3,161,395 | A | 12/1964 | Carter | |
| 3,248,899 | A * | 5/1966 | Anderson | E06B 9/44 160/326 |
| 3,362,461 | A | 1/1968 | Stark | |
| 4,023,819 | A | 5/1977 | Holman | |
| 4,657,426 | A * | 4/1987 | Targetti | F16B 7/0413 403/295 |
| 4,895,471 | A * | 1/1990 | Geltz | F16B 7/14 403/109.8 |
| 5,069,570 | A * | 12/1991 | Pryor | F16M 11/046 403/109.5 |
| 5,472,301 | A | 12/1995 | Wallen | |
| 6,470,948 | B2 | 10/2002 | Yates et al. | |
| 7,549,615 | B2 | 6/2009 | Shevick | |
| 7,621,313 | B2 | 11/2009 | Pham | |
| 8,596,594 | B2 | 12/2013 | Shevick | |
| 9,926,740 | B2 | 3/2018 | Pham et al. | |
| 10,538,962 | B2 | 1/2020 | Hall et al. | |
| 2008/0245486 | A1 | 10/2008 | Brown | |
| 2009/0242143 | A1 | 10/2009 | Pham | |
| 2011/0242827 | A1 | 10/2011 | Farinola et al. | |
| 2014/0263123 | A1 | 9/2014 | Ford | |
| 2016/0223000 | A1 * | 8/2016 | Aninos | A47B 45/00 |

FOREIGN PATENT DOCUMENTS

| | | |
|---|---|---|
| EP | 3372775 | 9/2018 |
| JP | H06146757 | 5/1994 |

OTHER PUBLICATIONS

Japanese Office Action with English Translation issued in Application No. 2018-206830 Mailing Date of Sep. 27, 2022 (9 pages).

* cited by examiner

Fig.12
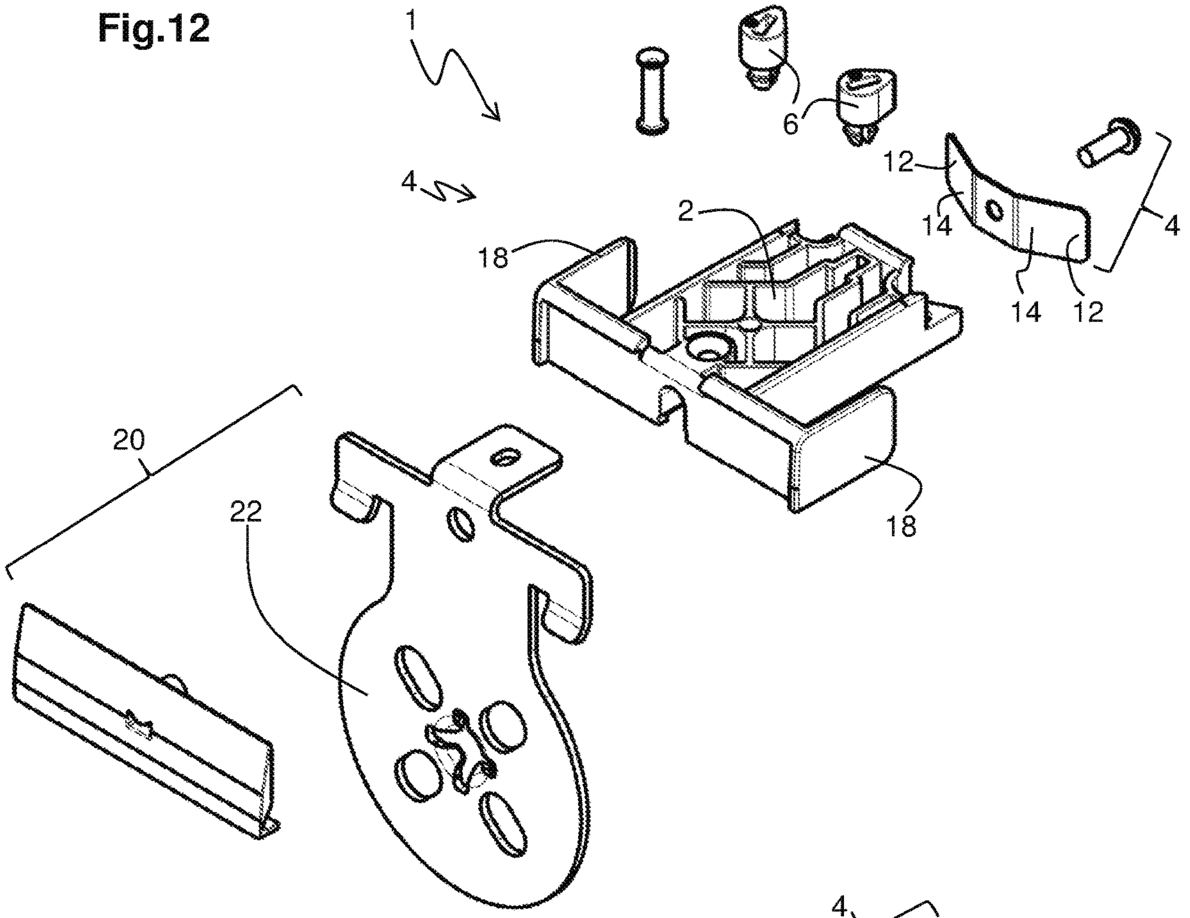
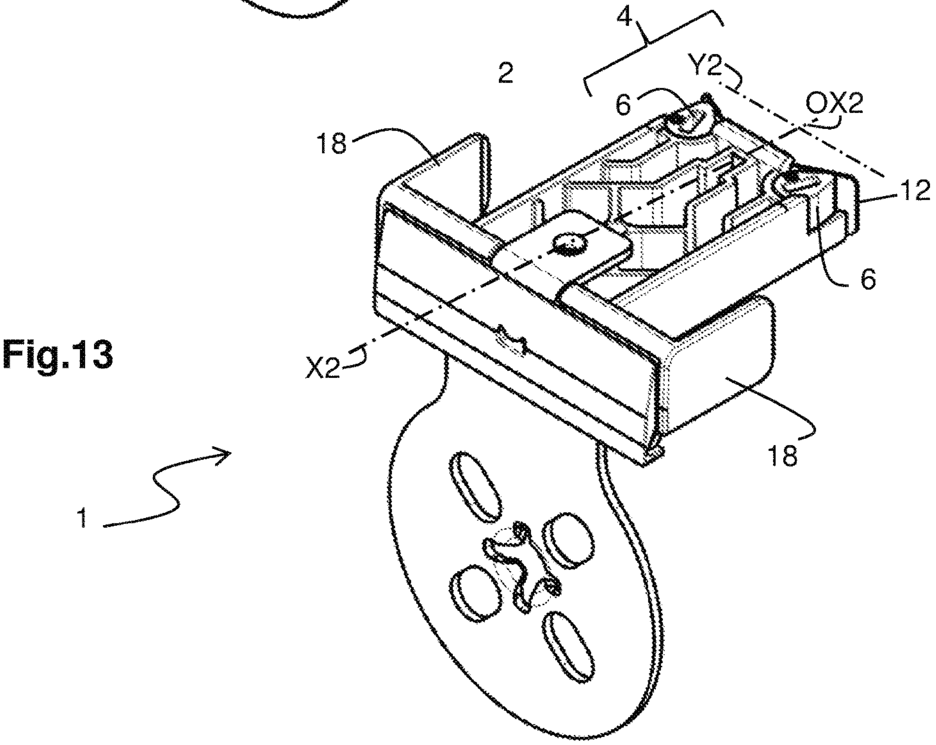
Fig.13

Fig.14
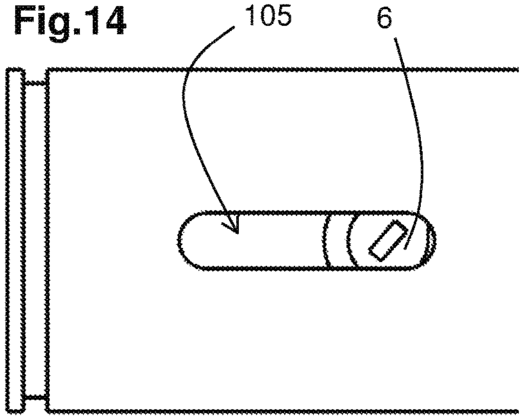
Fig.15
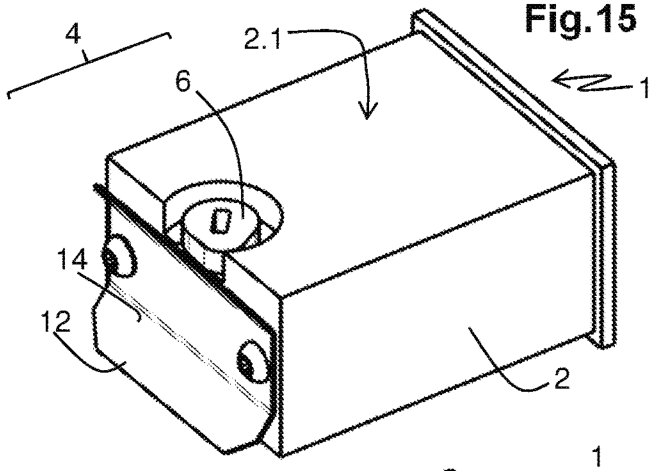
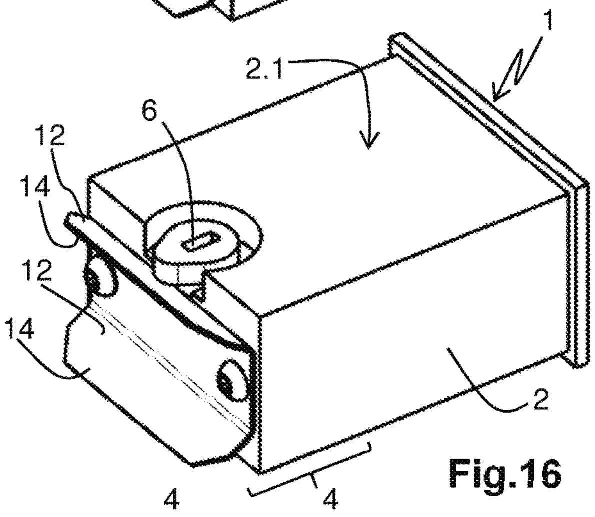
Fig.16
Fig.17
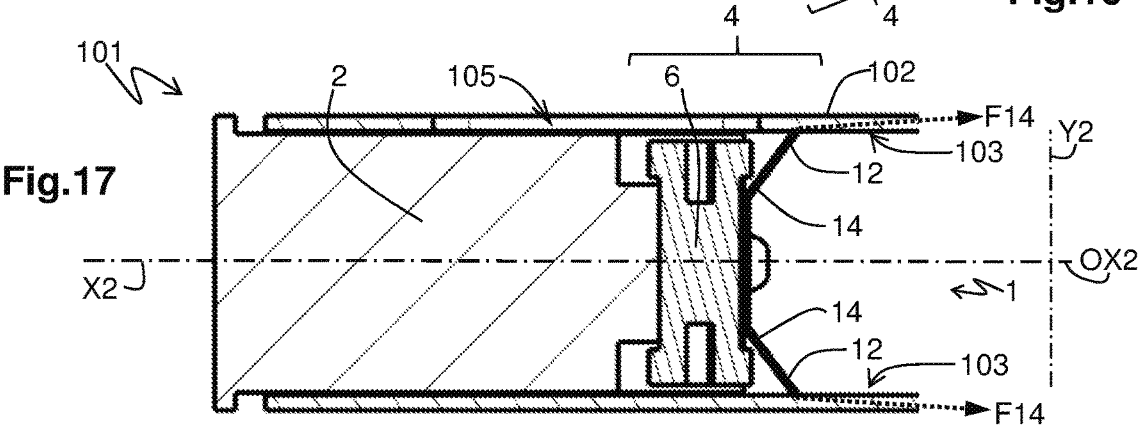
Fig.18
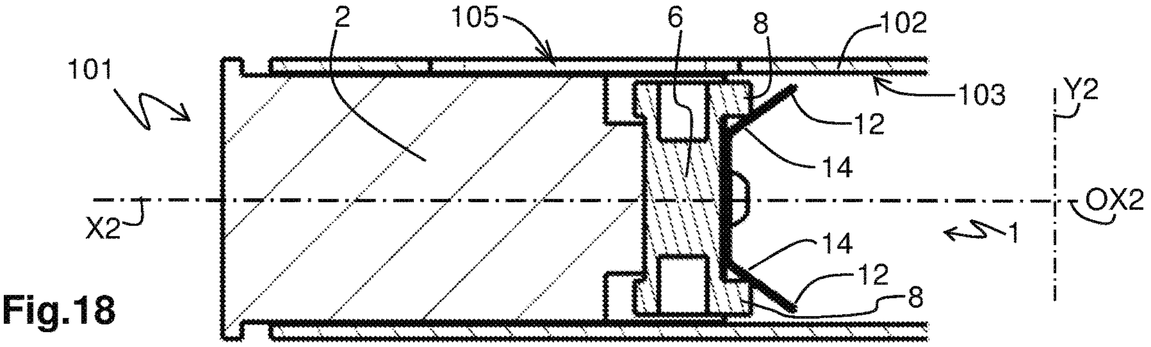

Fig.19
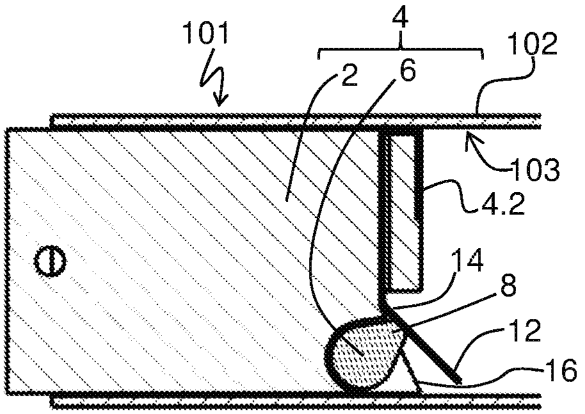
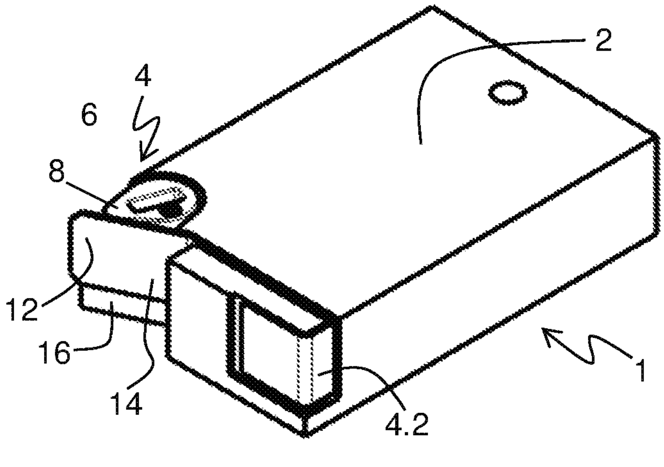
Fig.20

Fig.21
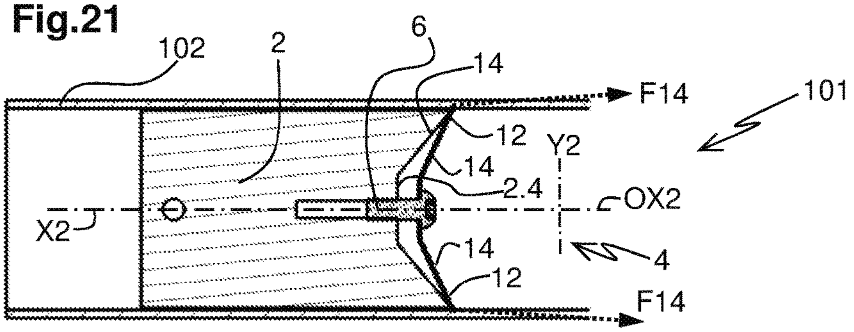
Fig.22
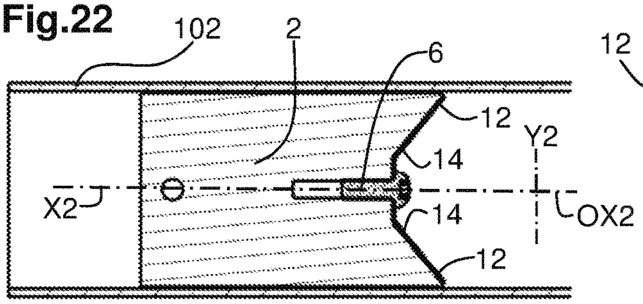
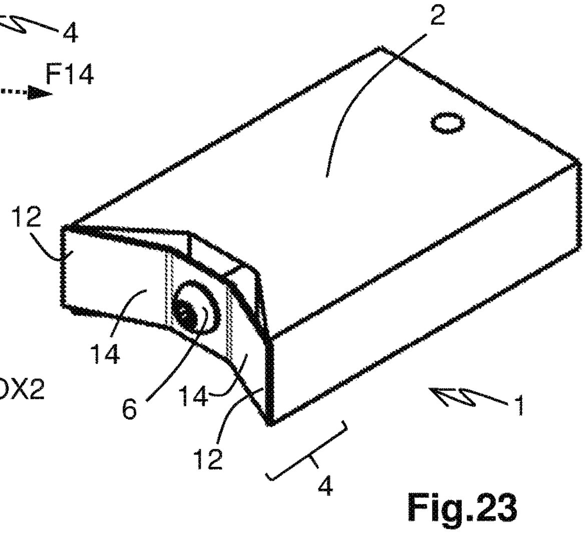
Fig.23
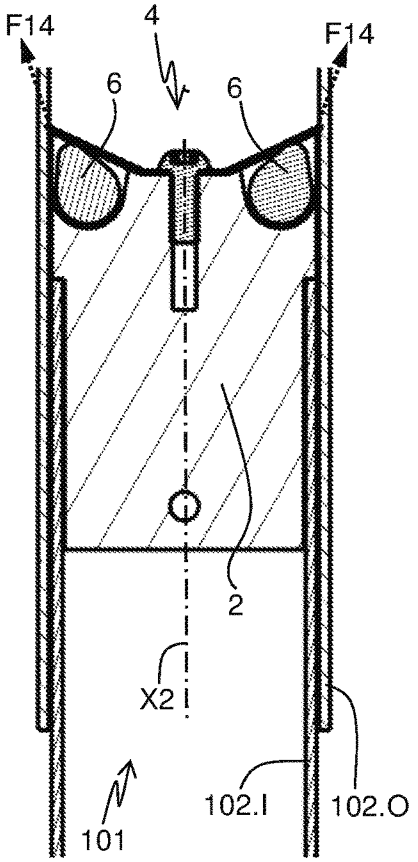
Fig.24
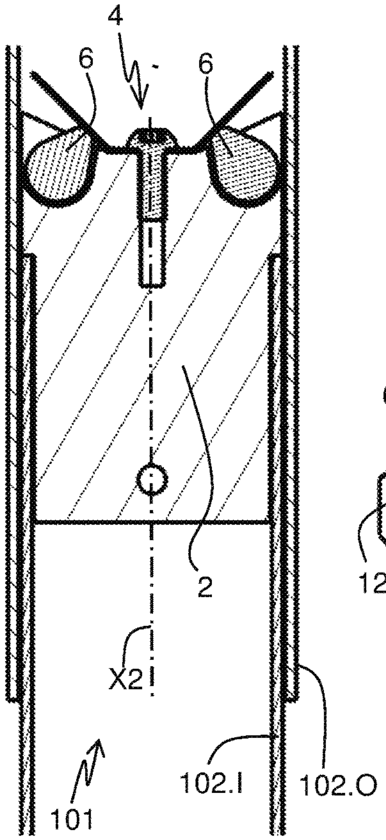
Fig.25
Fig.26
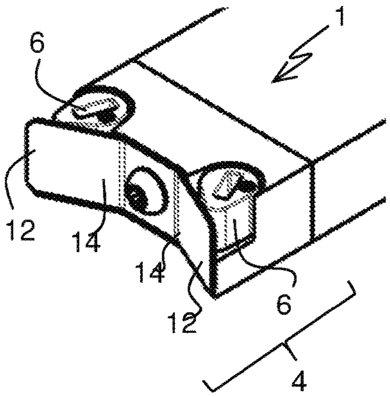

MOUNTING ELEMENT FOR MOUNTING AN ARCHITECTURAL COVERING BETWEEN OPPOSING MOUNTING SURFACES

CROSS-REFERENCE TO RELATED APPLICATIONS

This application is a continuation of U.S. patent application Ser. No. 16/174,899, filed Oct. 30, 2018, which, in turn, is based upon and claims the right of priority to EP Patent Application No. 17199,912.1, filed on Nov. 3, 2017, the disclosures of both of which are hereby incorporated by reference herein in their entirety for all purposes.

TECHNICAL FIELD

The present disclosure relates to a mounting element for mounting an architectural covering, such as a blind, between two opposing mounting surfaces, e.g. by a force fit (frictional fit) and/or form fit (e.g. if the recess has matching female or male relief). Furthermore, the present disclosure relates to an architectural covering comprising such a mounting element.

BACKGROUND ART

A mounting element for mounting an architectural covering (roller blind) in an architectural recess (window) is discussed in US2009242143A1, which is incorporated herein by reference in its entirety. The mounting element of US2009242143A1 comprises an elongate member, an extension mechanism manually retractable or extendable at one end of the elongate member, and a telescopic extender in the middle of the elongate member.

In order to adjust the overall length of the mounting element of US2009242143A1, the user must pull a locking pin, slide the telescopic extender and then insert the locking pin into a slot among a series of slots. However, the adjusting process is quite difficult and long to carry out. Moreover, the series of slots of US2009242143A1 only allows for a discrete adjustment of the overall length of the mounting element. As a result, the user may adjust the overall length only approximately, which in turn might cause the mounting element to not properly fit into the architectural recess.

SUMMARY

This summary of the disclosure is not intended to identify key features or essential features of the claimed subject matter, nor is it intended as an aid in determining the scope of the claimed subject matter.

Disclosed herein is an improved mounting element, which alleviates or at least reduces the afore-mentioned drawbacks. Such drawbacks may be alleviated or reduced with a mounting element, for mounting an architectural covering between two opposing mounting surfaces, the mounting element comprising:

- an elongate mounting member which is elongated along a longitudinal direction and which has a first end, a second end, and at least one guide surface, and
- an extension mechanism arranged at the first end, the extension mechanism being operable between: i) a retracted state, and ii) an extended state in which the extension mechanism abuts one of the opposing mounting surfaces when the mounting element is mounted between the opposing mounting surfaces, and

- a telescopic extender arranged at the second end, the telescopic extender being operable between a retracted configuration and an extended configuration so as to abut the other one of the opposing mounting surfaces when the mounting element is mounted between the opposing mounting surfaces, and wherein the telescopic extender comprises:

- a slidable body configured to slide along the guide surface parallel to the longitudinal direction in a first translation direction away from the first end so as to lengthen the mounting element, and
- a locking member mechanically coupled to the slidable body, the locking member being configured: i) to allow the slidable body to slide in the first translation direction, and ii) to engage the guide surface so as to prevent the slidable body from sliding in a second translation direction opposite the first translation direction.

Such a mounting element enables the user to easily and finely adjust the overall length of the mounting element to the dimension of the architectural recess. The user may conveniently draw, with only one hand, the slidable body outwards and the user may easily select any adjustment position along the continuous displacement of the slidable body as allowed by the locking member. The user may stop the slidable body, which is prevented by the locking member from returning in the second translation direction. The selected adjustment position cannot be unintentionally unsettled. After such easy adjustment, the user may place the mounting element in the architectural recess and the user may move, with only one hand, the extension mechanism from the retracted state to the extended state.

With respect to the background art devices it has proved easier to quickly adjust and durably maintain the overall length of a mounting element according to the first object, in which the extension mechanism and the telescopic extender work in a combined manner at both ends. It only takes two hands, without any tool nor any help needed from another person, whereas the background art devices would require two persons and/or tools to mount the architectural covering in the recess.

Furthermore, the forces exerted in a combined manner by the extension mechanism and the telescopic extender are strong enough to retain the mounting element in the architectural recess durably over time, even with a heavy blind.

Another object is to provide an architectural covering assembly comprising an architectural covering for covering an architectural recess, wherein the architectural covering assembly includes a mounting element according to the first object.

This summary is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment. All of the embodiments and aspects mentioned in this disclosure may hence form the subject-matter of a claim to patent protection, either in combination or independently.

This summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

Further features, aspects, and advantages of the present disclosure will also become apparent from the following detailed description of embodiments, when read in conjunction with the exemplary drawings in which:

FIG. 12 is a view similar to FIG. 5 of a telescopic extender belonging to a mounting element according to a second embodiment.

FIG. 13 is a schematic assembled view of the telescopic extender of FIG. 12.

FIG. 14 is a schematic top view of a part of a mounting element according to a third embodiment;

FIG. 15 is a schematic perspective view of the telescopic extender of FIG. 14, wherein the locking member is in a lock state;

FIG. 16 is a view similar to FIG. 15, wherein the locking member is in a release state;

FIG. 17 is a schematic cross-sectional view of a part of the mounting element of FIG. 14, wherein the locking member is in a lock state; and FIG. 18 is a view similar to FIG. 17 wherein the locking member is in a release state.

FIG. 19 is a schematic cross-sectional view of a part of a mounting element according to a fourth embodiment wherein the locking member is in a release state;

FIG. 20 is a schematic perspective view of the telescopic extender of FIG. 17, wherein the locking member is in a lock state;

FIG. 21 is a schematic perspective view of a mounting element according to a fifth embodiment;

FIG. 22 is a schematic cross-sectional view of a part of the mounting device of FIG. 21, wherein the locking member is in a lock state;

FIG. 23 is a view similar to FIG. 20 wherein the locking member is in a release state;

FIG. 24 is a schematic cross-sectional view of a mounting device according to a second, independent aspect, wherein the locking member is in a lock state;

FIG. 25 is a view similar to FIG. 24, wherein the locking member is in a release state;

FIG. 26 is schematic perspective view of the telescopic extender of FIG. 24.

Figure 1:
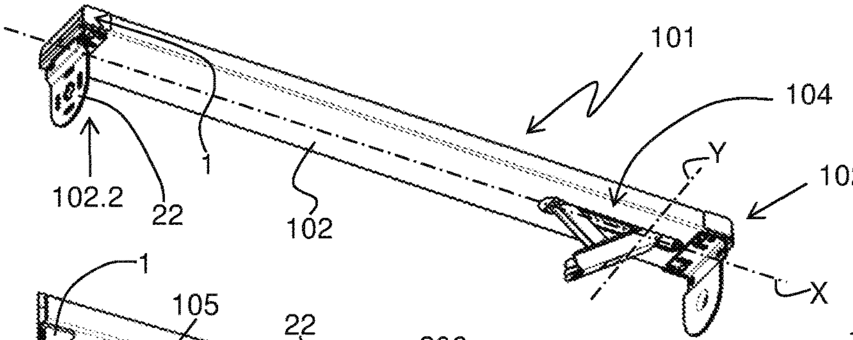
FIG. 1 is a schematic perspective view of a first example of a mounting element according to a first embodiment where an extension mechanism is placed in a retracted state.

The accompanying drawings are provided for purposes of illustration only, and the dimensions, positions, order, and relative sizes reflected in the drawings attached hereto may vary. The detailed description will be better understood in conjunction with the accompanying drawings. Reference now will be made in detail to embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

DETAILED DESCRIPTION

The afore-mentioned and other features and advantages of the present disclosure will be readily apparent from the following detailed description, the scope of the invention being set out in the appended claims. The telescopic extender disclosed herein enables the user to finely adjust the overall length of the mounting element in a stepless manner while the extension mechanism enables the user to fit in compression the mounting element between the opposing mounting surfaces.

According to an embodiment, the mounting element may further comprise a release mechanism mechanically coupled to the slidable body so as to be operable between a lock state and a release state, the release mechanism being configured to cooperate with the locking member such that:

i) the locking member prevents the slidable body from sliding in the second translation direction when the release mechanism is in the lock state, and ii) the slidable body is allowed to slide in the second translation direction when the release mechanism is in the release state.

Thus, the user may operate the release mechanism i) to the release state in order to push the telescopic extender in the second translation direction, and ii) to the lock state in order to prevent the telescopic extender from moving backwards. Moving the telescopic extender in the first translation direction ("drawing") increases the overall length of, hence extends or lengthens, the mounting element. Moving the telescopic extender in the second translation direction ("pushing") decreases the overall length of, hence shortens or retracts, the mounting element.

According to an embodiment, the release mechanism is configured to be actuated by a manual force, for example directly by hand.

Thus, the user may handle the release mechanism by hand directly, hence without any tool.

According to an embodiment, the release mechanism may comprise a pushing portion movable with respect to the slidable body, the pushing portion being configured to displace the locking member when the release mechanism is operated between the lock state and the release state.

According to an embodiment, the pushing portion may be movable at least in rotation with respect to the slidable body, the pushing portion optionally forming a cam.

For example, the pushing portion may be pivotally or rotatably moveable with respect to the slidable body, optionally along a predetermined angular range, which may be less than 360 degrees or less than 180 degrees. The pushing portion may advantageously be formed by a cam or an eccentric wheel, which may have a pushing surface located at a variable distance from an axis of rotation of the pushing portion, the distance varying as a function of the angle of rotation about the axis of rotation of the pushing portion. Alternatively to this example, the pushing portion may be slidable in the first or second translation direction with respect to the slidable body.

Thus, the release mechanism is quite simple to manipulate, as it suffices to move a pushing portion.

Alternatively to the previous embodiment, the release mechanism may comprise a drawing portion movable with respect to the slidable body, the drawing portion being configured to draw and displace the locking member when the release mechanism is operated between the lock state and the release state.

According to an embodiment, the locking member may comprise an engagement part for selective engagement of the locking member to the guide surface of the elongate mounting member, the engagement part extending at least in a lateral direction crossing the first and the second translation directions.

According to an embodiment, the locking member may further comprise a resilient part, the resilient part being coupled to the engagement part, the resilient part being configured to be elastically deformed by the release mechanism so as to change an amplitude of the extension of the engagement part in the lateral direction, i.e. change how far the engagement part extends in the lateral direction. Optionally, the engagement part and the resilient part are made integral, for example in one-piece, with one another.

Thus, the engagement part may maintain durably the longitudinal position of the telescopic extender by engaging the guide surface of the elongate mounting member. When the mounting element is in service, for example in an architectural recess, the slidable body may transmit a resulting force to the locking member substantially in the second translation direction. This resulting force may tend to strengthen the engagement between the engagement part and the guide surface, which engagement may in turn increasingly prevent the locking member, hence the slidable body, from sliding in the second translation direction. In other words, the resulting force reinforces an interlocking relation between the locking member and the elongate mounting member.

According to an aspect, the guide surface may include sidewalls of the elongate mounting member. Alternatively, the guide surface may include a longitudinal wall(s) extending inside the elongate mounting member and parallel to the first translation direction. Optionally, such longitudinal wall(s) may be integral or one-piece with a structural component of the elongate mounting member, for example a bottom wall or a top wall.

Throughout the present application, "bottom", "top", and the related terms pertain to the gravity direction considered when the mounting element is in service in an architectural recess. An element of the mounting element that extends downwards normally extends towards the blind when the mounting element is in service in an architectural recess.

According to an embodiment, the release mechanism may be configured to deform the resilient part so as to reduce the amplitude of the extension of the engagement part in the lateral direction when the release mechanism is in the release state.

According to an embodiment, the locking member may be comprised of a resilient material, for example a polymer, an elastomer, or a sheet metal, advantageously a spring steel, the locking member advantageously including a flat spring, a leaf spring, or a spring washer.

Thus, the locking member may be inexpensive and light.

According to an embodiment, the engagement part may extend obliquely with respect to the first translation direction and away from the second end of the elongate mounting member. The engagement part and the guide surface form an acute angle opening towards the second end. Thus extending obliquely the engagement part may extend not only in the lateral direction but also in the second translation direction.

Thus, high friction forces may be promoted between the engagement part and the guide surface when the slidable body with the locking member is moved in the second translation direction, hence towards the first end.

According to an embodiment, the locking member may be located at the end of the slidable body which is oriented towards the first end of the mounting element.

Thus, the locking member may be easily arranged to assemble the telescopic extender.

According to an embodiment, the guide surface may include at least one sidewall of the elongate mounting member, or two sidewalls and, optionally, a bottom wall connecting the sidewalls.

Thus, the guide surface may be formed by a profile having a rectangular cross-section, for example a square cross-section. Alternatively, the cross-section of such a profile may have any polygonal, curvilineal or composite outline.

According to an embodiment, the guide surface may be made or coated with a friction-promoting material, for example a polymeric material or a metallic material such as steel, and the engagement part is made or coated with a complementary friction-promoting material, for example steel, aluminum or a suitable polymer, so as to allow the engagement part to generate a friction force.

Thus, such materials may promote high friction forces between the engagement part and the guide surface. For example, the engagement part may dig or "bite" into the guide surface.

According to an aspect, the slidable body may have at least one outer extension arranged to overlap a portion of the guide surface. Throughout the present application, an "outer" element or an element that extends "outwards" or "outside" normally extends toward the closest one of the opposing mounting surfaces of the architectural recess.

Thus, the outer extension may hide and protect the second end.

According to an embodiment, the telescopic extender may further comprise an abutment device configured to abut the other one of the opposing mounting surfaces, and the mounting element may further comprise a holding part such as a mounting bracket configured to hold an end of the architectural covering. The holding part may alternatively be secured to the telescopic extender itself instead of being secured to the elongate mounting member, or optionally to the abutment device.

According to an aspect, the abutment device may have a manipulation part configured to be manipulated such that an operator may move the slidable body in the first translation direction and/or in the second translation direction in case the telescopic extender comprises a release mechanism. The manipulation part may be formed by the holding part, for example a bracket. The manipulation part may be secured to the telescopic extender. For example, the manipulation part may be coupled to or integral with the slidable body.

Thus, the abutment device may help in holding the mounting element in place against the opposing mounting surface.

According to an aspect, the holding part, for example a bracket, may be coupled to, optionally integral with, the telescopic extender, for example the slidable body. In such an aspect, the holding part moves together with the telescopic extender. In such an aspect, the holding part ends up very close to the wall, which minimizes the light gap between the wall and the blind.

According to an embodiment, the extension mechanism may further comprise:

- an actuator rotatable about a rotation axis, the rotation axis being substantially perpendicular to the longitudinal direction, and
- a conversion mechanism configured to convert a rotation of the actuator into a translatory movement of the rotation axis parallel to the longitudinal direction from the retracted state to the extended state and vice versa.

According to an aspect, the guide surface may extend at least near the second end.

According to an aspect, the release mechanism may comprise at least two pushing portions. The pushing portions may be movable either independently or simultaneously with respect to the slidable body.

According to an aspect, the engagement part may be cantilevered so as protrude from the slidable body when the release mechanism is in the release state.

According to an aspect, the engagement part may be placed selectively:

- i) in a contact configuration wherein the engagement part a) may slide along the guide surface when the slidable body slides in the first translation direction, and b) may generate a friction force against the guide surface so as to prevent the slidable body from sliding in the second translation direction, and
- ii) in a release configuration wherein the engagement part does not contact the guide surface such that the slidable body may slide in the second translation direction.

According to an aspect, the engagement part may be placed in the contact configuration when the release mechanism is in the lock state, whereas the engagement part may be placed in the release configuration when the release mechanism is in the release state.

According to an aspect, the slidable body has a stopping portion arranged to prevent the resilient part from moving beyond the contact configuration in the first translation direction.

According to an aspect, the engagement part and the resilient part are made integral, advantageously one-piece.

According to an aspect, the locking member may be comprised of sheet metal, for example of a spring steel.

According to an aspect, the engagement part is cantilevered so as to protrude laterally from the slidable body when the at least one engagement part is in the contact configuration.

According to an aspect, the locking member may include only one engagement part and only one resilient part.

Alternatively to this aspect, the locking member includes at least two engagement parts and two resilient parts secured respectively to the engagement parts, such that the locking member may contact the guide surface on two different locations, for example on two opposite locations.

According to an aspect, the resilient part may be at least partially movable between: i) a stop position in which the resilient part lies against a stopping portion, and ii) a distant position in which the resilient part is distant from the stopping portion.

Throughout the present application the term "parallel" encompasses both substantially "parallel to" and substantially "collinear with". A direction substantially "parallel to" or substantially "collinear with" another direction may form an angle ranging from 175 to 185 degrees.

According to an aspect, the elongate mounting member may be a headrail. The architectural covering may be a blind, for example a roller blind, a Venetian blind, a pleated blind, a honeycomb blind, a Roman shade etc. The elongate mounting member may be equipped with any type of bracket suitable for holding such architectural covering. The opposing mounting surfaces may be the two vertical surfaces of a window frame. The elongate mounting member holds the architectural covering next to the window.

According to an aspect, the release mechanism may be accessible from above the bottom wall.

According to an aspect, the guide surface may further include a top wall opposite the bottom wall. The top wall may have an access opening configured to let an operator access the release mechanism. Alternatively, the bottom wall or a sidewall wall may have an access opening configured to let an operator access the release mechanism, depending on the arrangement of the release mechanism with respect to the elongate mounting member. The opening located in a wall of the elongate mounting member may be an aperture or a slot.

According to an aspect, the conversion mechanism may further comprise a connection member operably coupled to the elongate mounting member and to the actuator.

According to an aspect, the actuator and the connection member may have substantially elongated shapes. The actuator and the connection member may be substantially parallel when the extension mechanism is placed in the extended state.

According to an aspect, the connection member may be hinged to the elongate mounting member so as to rotate about a hinge axis which is orthogonal to the longitudinal direction.

According to an aspect, the abutment device may be composed at least partially of an elastomeric material, for example of rubber.

Throughout the present application the adjective "longitudinal" encompasses an element, for example a guiding slot, which extends along, such as substantially parallel to, the longitudinal direction along which the elongate mounting member is elongated.

According to an aspect, the actuator may protrude from the elongate mounting member when the extension mechanism is in the retracted state.

According to an aspect, the mounting element may further comprise a friction member arranged to abut one of the opposing mounting surfaces when the extension mechanism is in the extended state. The friction member may convert a part of the translatory movement into an upwardly-oriented friction force when the friction member abuts the opposing mounting surface.

According to an aspect, the elongate mounting member may form a housing configured to substantially accommodate the extension mechanism in the extended state.

According to an aspect, a portion of the elongate mounting member may substantially surround a portion of the extension mechanism and a portion of the telescopic extender, such that, in a cross-sectional direction (i.e. in a plane perpendicular to the longitudinal direction), the extension mechanism and the telescopic extender cannot be separated from the elongate mounting member while they slide parallel to the first translation direction.

Throughout the present application the term "telescopic" encompasses slidable parts that slide one within another like the tubes of a jointed telescope such that the assembly of these slidable parts may be extended or shortened.

Some embodiments will be described hereafter with reference to the exemplary drawings, in which like reference signs refer to like parts or features.

Figure 2:
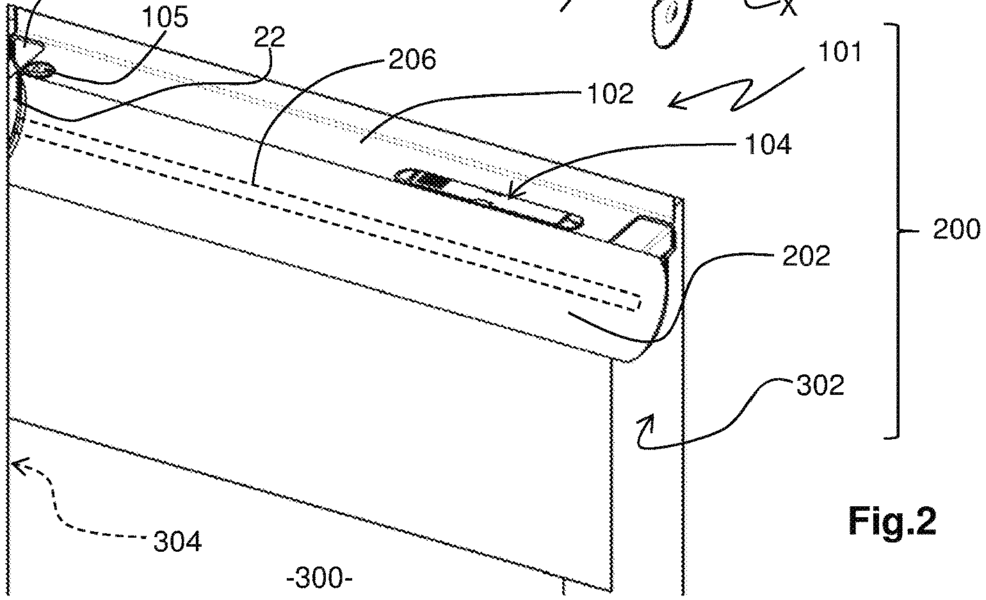
FIG. 2 is a schematic perspective view of an architectural covering assembly including the mounting element of FIG. 1, which holds an architectural covering and where the extension mechanism is placed in an extended state.

FIGS. 1 to 11 depict a mounting element 101 for mounting an architectural covering 202 in an architectural recess 300. The architectural covering 202 may be formed by a roller blind, which is supported by the mounting element 101. As depicted in FIG. 2, the architectural recess 300 may be formed by a window frame having two opposing mounting surfaces 302 and 304. Mounting element 101 and architectural covering 202 form an architectural covering assembly 200, as depicted in FIG. 2.

Figure 3:
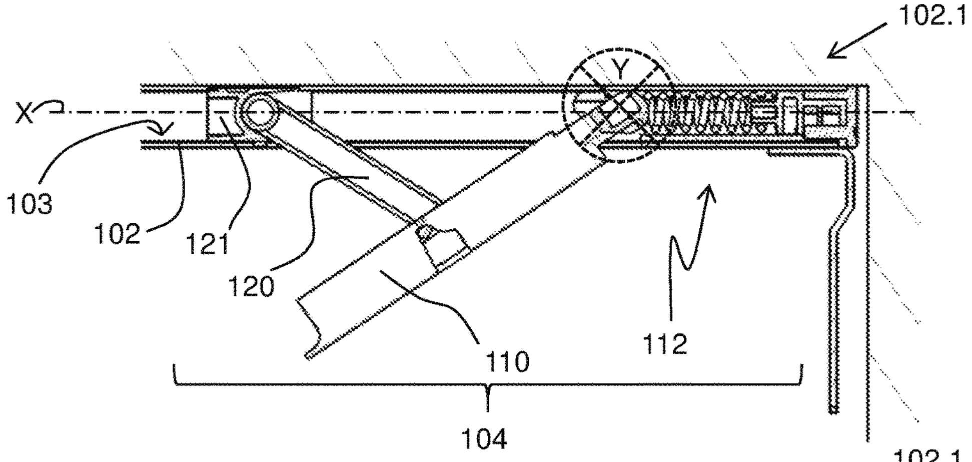
FIG. 3 is a schematic cross-sectional view of the mounting element of FIG. 1 (retracted state, without the architectural covering)

Mounting element 101 may comprise an elongate mounting member 102, an extension mechanism 104, and a telescopic extender 1, which is operable between a retracted configuration (FIGS. 1 and 4) and an extended configuration (FIGS. 2 and 3). Elongate mounting member 102 may be elongated along a longitudinal direction X and have a first end 102.1, a second end 102.2, as illustrated in FIG. 1. Elongate mounting member 102 may have at least one guide surface 103, as illustrated in FIGS. 3, 4 and 7 to 11. Elongate mounting member 102 may be a formed as a headrail. Elongate mounting member 102 holds the architectural covering 202 adjacent the window.

Guide surface 103 may be formed by two sidewalls 103.1 and a bottom wall 103.2 connecting the sidewalls 103.1. Elongate mounting member 102 may further have a top wall, which is located opposite the bottom wall 103.2 and which also connects sidewalls 103.1. Elongate mounting member 102 may be configured to allow access to telescopic extender 1, such as via an open space formed in at least a portion of guide surface 103. For example, guide surface 103 may have an access opening 105, as illustrated in FIG. 2, which is configured to let an operator access the release mechanism 6. According to different design variations, access opening 105 may be arranged in the top wall, the bottom wall 103.2 or a sidewall 103.1. In a not shown variant, the top wall may also be a guide surface in case the telescopic extender is rotated 90 degrees and the release mechanism is accessible from a sidewall through an opening.

On the one hand, extension mechanism 104 may be arranged at first end 102.1. Extension mechanism 104 may be operable between: i) a retracted state (FIGS. 1 and 3) in which the user may position mounting element 101 in architectural recess 300, and ii) an extended state (FIGS. 2 and 4) in which the extension mechanism 104 abuts one of the opposing mounting surfaces 302 when mounting element 101 is mounted between opposing mounting surfaces 302, 304.

On the other hand, telescopic extender 1 may be arranged at the second end 102.2 so as to abut the other one 304 of opposing mounting surfaces 302, 304 when the mounting element 101 is mounted between opposing mounting surfaces 302, 304.

As depicted in FIGS. 1 to 4, extension mechanism 104 may comprise an actuator 110, a conversion mechanism 112, and a connection member 120 for connecting actuator 110 to elongate mounting member 102. Extension mechanism 104 may be formed as the extension mechanism described in the European patent application EP17159407.0, the content of which is herein incorporated by reference.

Figure 4:
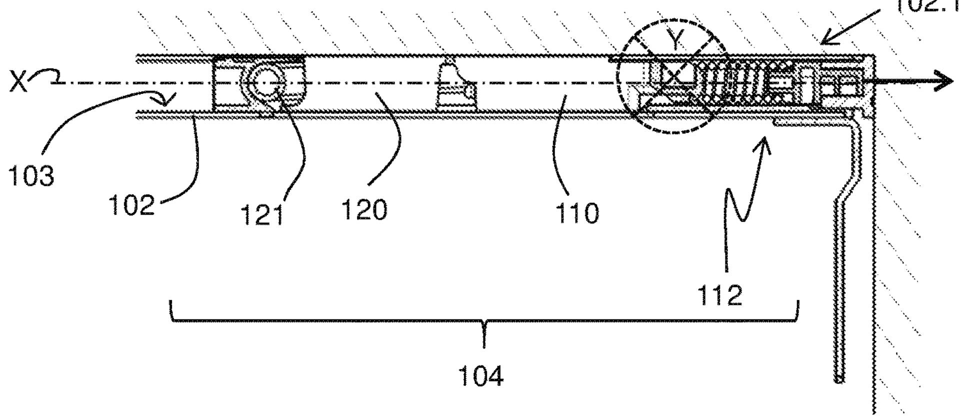
FIG. 4 is a schematic cross-sectional view of the mounting element of FIG. 2 (extended state, without the architectural covering)

Actuator 110 may be rotatable about a rotation axis Y, which may be substantially perpendicular to the longitudinal direction X. Conversion mechanism 112 may be configured to convert a rotation or pivoting of the actuator 110 into a translatory movement of rotation axis Y parallel to the longitudinal direction X from the retracted state (FIGS. 1 and 3) to the extended state (FIGS. 2 and 4). Vice versa, conversion mechanism 112 may be configured to convert a rotation or pivoting of the actuator 110 into a translatory movement of rotation axis Y parallel to the longitudinal direction X from the extended state (FIGS. 2 and 4) to the retracted state (FIGS. 1 and 3).

Actuator 110 and connection member 120 may have substantially elongated shapes and be substantially parallel to one another when the extension mechanism 104 is placed in the extended state (FIGS. 2 and 4). Actuator 110 may protrude from elongate mounting member 102 when extension mechanism 104 is in the retracted state (FIGS. 1 and 3).

Actuator 110 may be formed as a crank, and connection member 120 may be formed as a connecting rod that is mechanically coupled to a pivot 121. Connection member 120 may be operably coupled to elongate mounting member 102 and to actuator 110. Connection member 120 may be hinged to elongate mounting member 102 so as to rotate about a hinge axis which is orthogonal to longitudinal direction X and parallel to rotation axis Y.

Mounting element 101 may further comprise a friction member arranged to abut one of opposing mounting surfaces 302, 304 when extension mechanism 104 is in the extended state (FIGS. 2 and 4). The friction member may convert a part of the translatory movement into an upwardly-oriented friction force when the friction member abuts opposing mounting surface 302.

Figure 7:
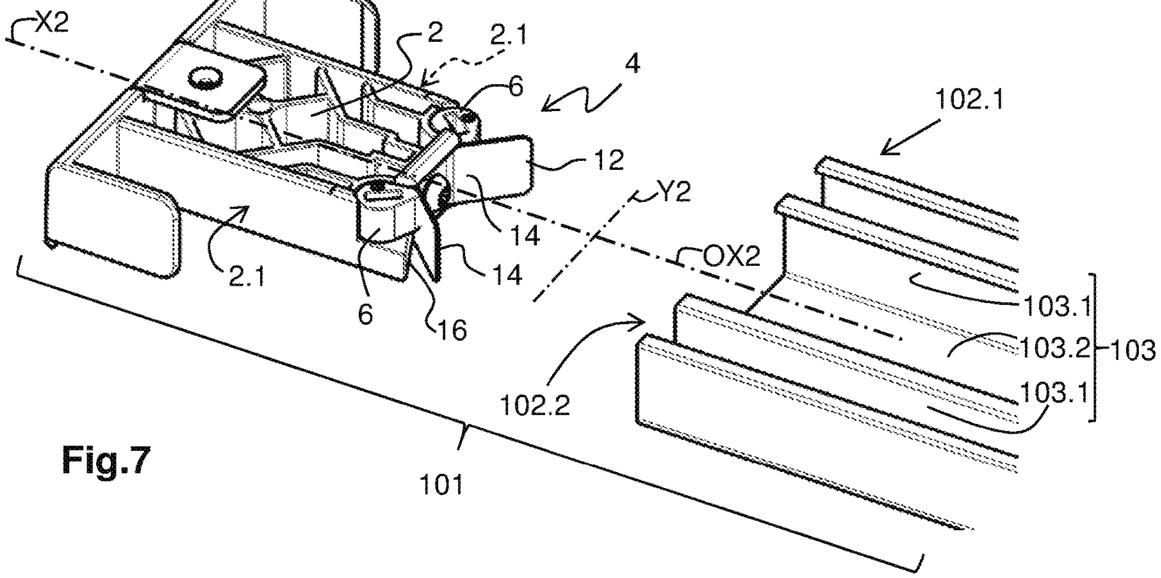
FIG. 7 is a schematic exploded view of a part of the mounting element of FIG. 1 including the telescopic extender.

As illustrated in FIG. 7, the telescopic extender 1 may comprise a slidable body 2 and a locking member 4. Slidable body 2 may be configured to slide i) along guide surface 103 ii) parallel to the longitudinal direction X iii) in a first translation direction X2. When slidable body 2 thusly slides iv) away from the first end 102.1 of elongate mounting member 102 it enables the user to lengthen the mounting element 101. Slidable body 2 may have slide faces 2.1, which herein lie opposite to one another.

Locking member 4 may be mechanically coupled to slidable body 2. For example a portion of locking member 4 may be fastened to slidable body 2 by means of a screw 5. Locking member 4 may be located at the end of the slidable body 2 which is oriented towards first end 102.1 of elongate mounting member 102.

Locking member 4 may be configured to allow slidable body 2 to slide in first translation direction X2. Further, locking member 4 may be configured to engage guide surface 103 so as to prevent slidable body 2 from sliding in a second translation direction OX2 opposite the first translation direction X2. When slidable body 2 is urged in first translation direction X2 locking member 4 may slide along guide surface 103 such that slidable body 2 slides, herein translates. When slidable body 2 is urged in second translation direction OX2 locking member 4 may engage guide surface 103 such that slidable body 2 is prevented from sliding in second translation direction OX2 by the friction forces due to the engagement of locking member 4 and guide surface 103.

Figure 8:
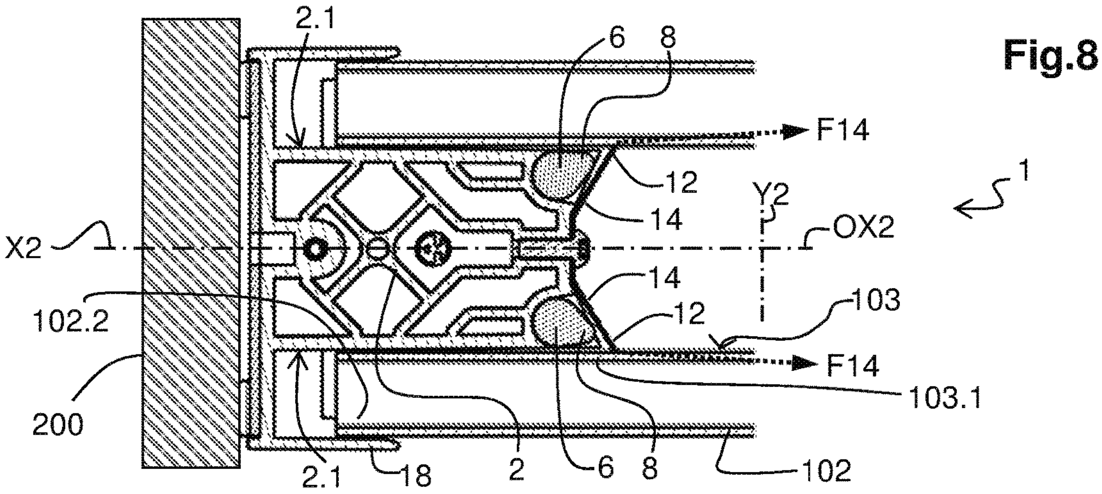
FIG. 8 is a schematic cross-sectional view of a part of the mounting element of FIG. 1 including the telescopic extender having a locking member is in a lock state.
Figure 9:
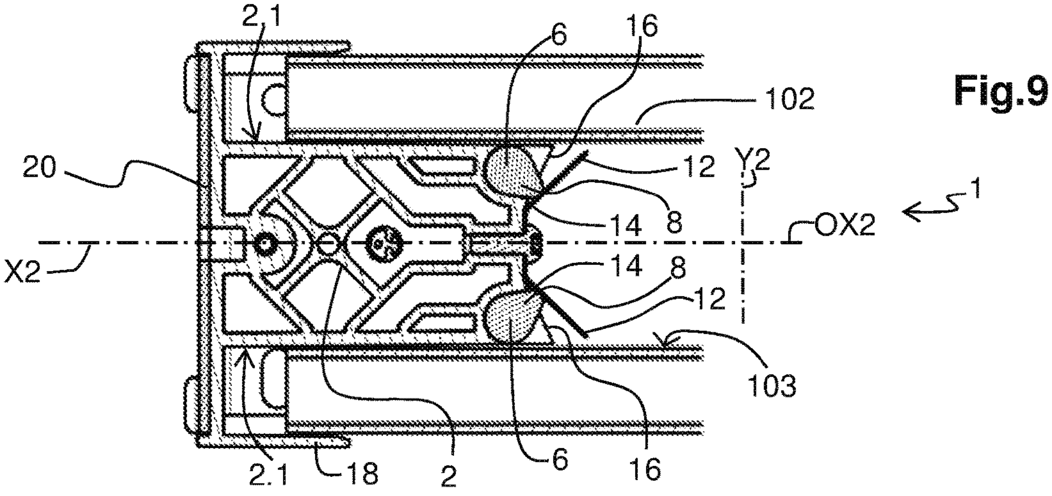
FIG. 9 is a view similar to FIG. 8 wherein the locking member is in a release state.

Mounting element 101 may comprise a release mechanism 6, which is mechanically coupled to slidable body 2 so as to be operable between a lock state (FIGS. 8, 10 and 11) and a release state (FIG. 9). Release mechanism 6 may be configured to cooperate with locking member 4 such that:

iii) locking member 4 prevents slidable body 2 from sliding in the second translation direction OX2 when the release mechanism 6 is in the lock state (FIGS. 8, 10 and 11), and iv) slidable body 2 is allowed to slide in the second translation direction OX2 when the release mechanism 6 is in the release state (FIG. 9).

Figure 5:
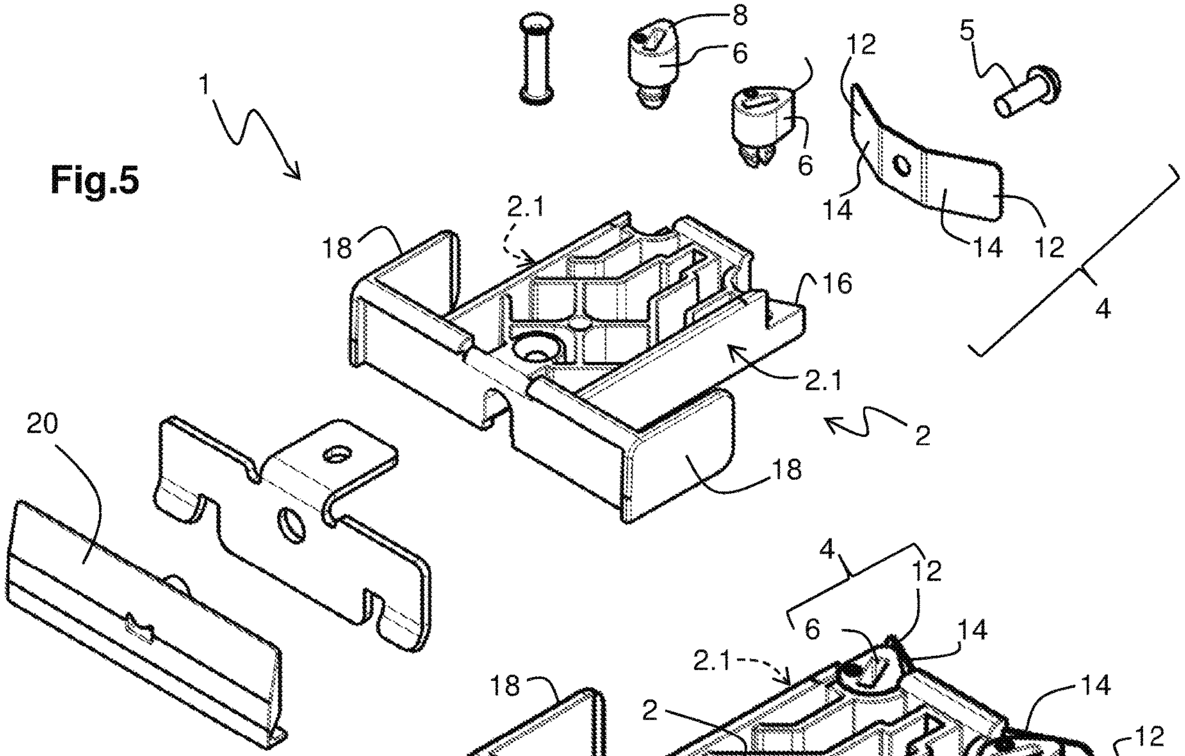
FIG. 5 is a schematic exploded view of a telescopic extender to be received at least partially within the mounting element of FIG. 1.
Figure 6:
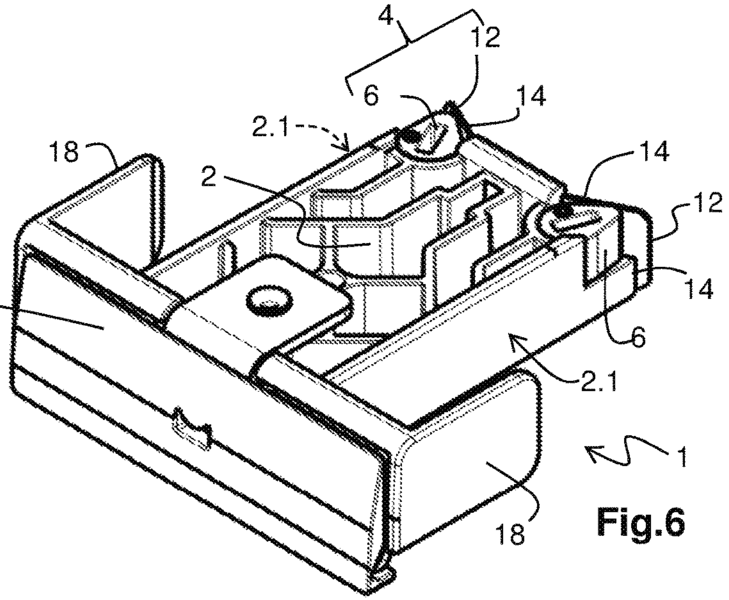
FIG. 6 is a schematic assembled view of the telescopic extender of FIG. 5.

As depicted in FIG. 5 locking member 4 may be comprised of a flat spring or leaf spring. Locking member 4 may be comprised of a polymer, an elastomer, or a sheet metal, for example of a spring steel. Locking member 4 may comprise an engagement part 12 for selective engagement of locking member 4 to guide surface 103. Locking member 4 may further comprise a resilient part 14, which is connected to engagement part 12 so as to allow engagement part 12 to move elastically. Engagement part 12 and resilient part 14 are herein illustrated as being made integral, and in particular in one-piece, with one another. Alternatively, engagement part 12 and resilient part 14 may be separate pieces that are mechanically linked.

As illustrated in FIGS. 7 and 8, engagement part 12 and guide surface 103 may form an acute angle opening towards second end 102.2 of elongate mounting member 102.

As illustrated in FIG. 8, locking member 4 herein includes two engagement parts 12 and two resilient parts 14. Engagement parts 12 may engage one or more respective sidewall(s) 103.1 of the elongate mounting member 102. Resilient parts 14 may respectively support the engagement parts 12. Locking member 4 can thus contact guide surface 103 on two different, opposite locations.

When telescopic extender 1 is in service, the engagement part 12 of the flat spring allows slidable body 2 to slide in first translation direction X2. In contrast, when telescopic extender 1 is in service, engagement part 12 of the flat spring engages guide surface 103 where it induces a high friction force, which prevents slidable body 2 from sliding in second translation direction OX2.

Engagement part 12 may extend at least in a lateral direction Y2 crossing the first X2 and the second OX2 translation directions. Locking member 4 may be configured to be elastically deformed by release mechanism 6 so as to change an amplitude of the extension of the engagement part 12 in lateral direction Y2. In particular, at least one of the or each resilient part 14 and the or each engagement part 12 may be elastically deformed by release mechanism 6.

Release mechanism 6 may be configured to be actuated by a manual force, for example by hand or by a hand tool. Release mechanism may be accessible from through the bottom wall, a sidewall or a top wall.

Release mechanism 6 may comprise a pushing portion 8 movable, for example herein to rotate, with respect to slidable body 2. Pushing portion 8 may be configured to displace locking member 4 when release mechanism 6 is operated between the lock state (FIGS. 8, 10 and 11) and the release state (FIG. 9).

Figure 10:
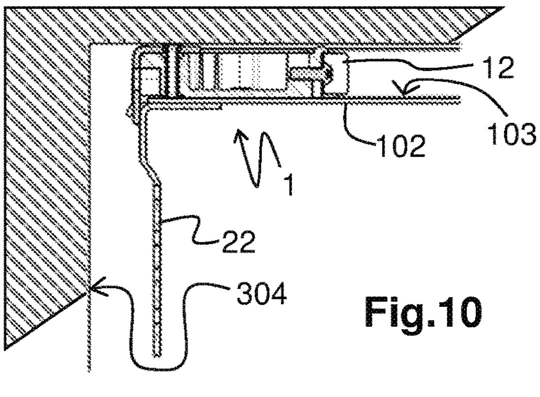
FIG. 10 is a schematic side view of a part of the mounting element of FIG. 1 wherein the telescopic extender is in a first longitudinal position.
Figure 11:
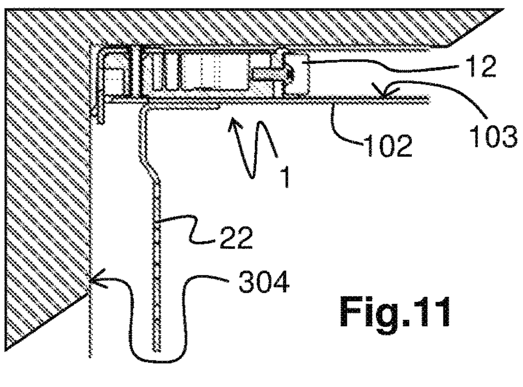
FIG. 11 is a schematic side view of a part of the mounting element of FIG. 1 wherein the telescopic extender is in a second longitudinal position.

Furthermore, release mechanism 6 may be configured to deform resilient part 14 so as to reduce the amplitude of the extension, along lateral direction Y2, of engagement part 12 when release mechanism 6 is in the release state of FIG. 9, as compared to the lock state of FIGS. 8, 10 and 11.

In FIG. 8, release mechanism 6 is depicted in the lock state and the locking member 4, depicted as a leaf spring, has engagement parts 12 extending in lateral direction Y2 with such an amplitude that engagement parts 12 engage sidewalls 103.1 of guide surface 103. This engagement has the effect of resisting movement of the slidable member 2 in second translation direction OX2.

In FIG. 9, release mechanism 6 is depicted in the release state, in which locking member 4 has engagement parts 12 extending in lateral direction Y2 with a lesser extent or amplitude than in the lock state of FIG. 8, such that engagement parts 12 do not engage nor touch sidewalls 103.1. In the release state slidable body 2 may be slid in second translation direction OX2, i.e. towards first end 102.1 of elongate mounting member 102.

Release mechanism 6 may comprise two pushing portions 8 movable independently with respect to slidable body 2. Engagement part 12 may be cantilevered so as protrude from slidable body 2 when release mechanism 6 is in the release state (FIG. 9).

Engagement part 12 may be placed selectively:

i) in a contact configuration (FIGS. 8, 10 and 11; release mechanism 6 in lock state) wherein engagement part 12
a) may slide along guide surface 103 when slidable body 2 slides in the first translation direction X2, and
b) may generate a friction force FIG. 14 (FIG. 8) against guide surface 103 so as to prevent slidable body 2 from sliding in the second translation direction OX2, and ii) in a release configuration (FIG. 9; release mechanism 6 in release state) wherein engagement part 12 does not contact guide surface 103 such that slidable body 2 may slide in the second translation direction OX2.

Guide surface 103 may extend not only near the second end 102.2 of elongate mounting member 102 but also along elongate mounting member 102. Guide surface 103 may be made or coated with a friction-promoting material, like a polymeric material or a metallic material such as steel. Likewise, engagement part 12 of locking member 4 may be made or coated of a complementary friction-promoting material, like steel or a polymer, so as to allow engagement part 12 to generate a friction force F14 (FIG. 8).

Elongate mounting member 102 may form a housing configured to substantially accommodate extension mechanism 104 in its extended state. A portion of elongate mounting member 102 may thus substantially surround a portion of extension mechanism 104 and a portion of telescopic extender 1, such that, in a cross-sectional direction (i.e. perpendicular to longitudinal direction X), extension mechanism 104 and telescopic extender 1 cannot be separated from elongate mounting member 102 while they are slidable parallel to first translation direction X2.

As illustrated on FIGS. 8 and 9, slidable body 2 may have at least one outer extension 18 arranged to overlap a portion of guide surface 103. When mounting element is in an assembled state (FIGS. 8 and 9), telescopic extender 1 protrudes from second end 102.2 of elongate mounting member 102 and outer extension 18 covers an outer, lateral portion of elongate mounting member 102.

Slidable body 2 may have a stopping portion 16 arranged to prevent the resilient part 14 from moving beyond the contact configuration (release mechanism 6 in lock state) in the first translation direction X2. Resilient part 14 may be movable between: i) a stop position in which resilient part 14 lies against the stopping portion 16, and ii) a distant position in which resilient part 14 is distant from the stopping portion 16.

Resilient part 14 may be less deformed in the distant position than in the stop position. For example, resilient part 14 may be in its rest state when in the distant position. Alternatively to this example, resilient part 14 may be already deformed or loaded when it stands in the distant position, and needs to be further deformed, hence more loaded, in order to reach the stop position.

Telescopic extender 1 may further comprise an abutment device 20 configured to abut opposing mounting surface 304. Abutment device 20 may be composed of any suitable material, for example of an elastomeric material or a metallic material. Abutment device 20 may be formed substantially of a rectangular plate.

As illustrated in FIG. 2, mounting element 101 may further comprise a holding part 22 configured to hold an end of the architectural covering 202. Holding part 22 may be secured to the bottom face of elongate mounting member 102, for example by means of glue, screw, rivets or welds. Holding part 22 may be a bracket having a hole for supporting a mounting structure 206 of architectural covering 202. As illustrated in FIGS. 1 to 4, a similar holding part may be secured to the first end 102.1 such that both ends of mounting structure 206 are supported.

FIGS. 12 and 13 illustrate a second embodiment of a telescopic extender 1 to be received at least partially within a not shown mounting element that is substantially similar to the one illustrated in FIGS. 1 to 11. Inasmuch as telescopic extender 1 of FIGS. 12 and 13 is similar to telescopic extender 1 of FIGS. 1 to 11, the afore-detailed description may be applied to telescopic extender 1 of FIGS. 12 and 13, but for the hereinafter mentioned noticeable differences. An element of telescopic extender 1 of FIGS. 12 and 13 having a structure or function substantially similar to an element of telescopic extender 1 of FIGS. 1 to 11 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like telescopic extender 1 of FIGS. 1 to 11, telescopic extender 1 of FIGS. 12 and 13 may comprise a slidable body 2 with a locking member 4 having two engagement parts 12 and two resilient parts 14, a release mechanism 6, and an abutment device 20. Further, the mounting element of FIGS. 12 and 13 may comprise a holding part 22 configured to hold an end of architectural covering 202. Locking member 4 may allow telescopic extender 1 to slide in first translation direction X2, but locking member 4 may prevent telescopic extender 1 from sliding in second translation direction OX2. Release mechanism 6 may reduce the lateral extension of engagement part 12 in a lateral direction Y2, hence reduce how far engagement part 12 extends in lateral direction Y2, when release mechanism 6 is in the release state.

Telescopic extender 1 of FIGS. 12 and 13 mainly differs from telescopic extender 1 of FIGS. 1 to 11 in that holding part 22 may be secured to telescopic extender 1. For example, holding part 22 may be secured to the abutment device 20, optionally by means of glue, screw, rivets or welds.

Telescopic extender 1 of FIGS. 12 and 13 further differs from telescopic extender 1 of FIGS. 1 to 11 in that abutment device 20 may have a manipulation part, which may herein be formed by holding part 22, which is configured to be manipulated such that an operator may move slidable body 2 in first translation direction X2 and in second translation direction OX2 as telescopic extender 1 comprises a release mechanism 6. Holding part 22 may be coupled to or optionally integral with, telescopic extender 1.

Thus, holding part 22 may move together with telescopic extender 1. Holding part 22 ends up very close to opposing mounting surface 304, which minimizes the light gap between opposing mounting surface 304 (window frame) and architectural covering 202.

FIGS. 14 to 18 illustrate a third embodiment of a mounting element 101. Inasmuch as mounting element 101 of FIGS. 14 to 18 is similar to mounting element 101 of FIGS. 1 to 11, the afore-detailed description may be applied to mounting element 101 of FIGS. 14 to 18, but for the hereinafter mentioned noticeable differences. An element of mounting element 101 of FIGS. 14 to 18 having a structure or function substantially similar to an element of mounting element 101 of FIGS. 1 to 11 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like mounting element 101 of FIGS. 1 to 11, mounting element 101 of FIGS. 14 to 18 may comprise an elongate mounting member 102, a not shown extension mechanism, and a telescopic extender 1, which are similar to the ones depicted in FIGS. 1 to 11. Telescopic extender 1 may for example comprise a slidable body 2 with slide faces 2.1, a locking member 4 having two engagement parts 12 and two resilient parts 14, and a release mechanism 6 having two pushing portions 8. Locking member 4 may allow telescopic extender 1 to slide in first translation direction X2, but locking member 4 may generate a friction force F14 to prevent telescopic extender 1 from sliding in second translation direction OX2. Release mechanism 6 may reduce the amplitude of the extension of engagement part 12 in lateral direction Y2 when release mechanism 6 is in the release state.

Mounting element 101 of FIGS. 14 to 18 mainly differs from mounting element 101 of FIGS. 1 to 11 in that the pushing portions 8 may be movable simultaneously instead of independently with respect to slidable body 2. The two pushing portions 8 may for example be integral, for example one-piece, with one another such that they rotate or pivot simultaneously. Thus, a user can easily and quickly rotate simultaneously both pushing portions 8.

Mounting element 101 of FIGS. 14 to 18 further differs from mounting element 101 of FIGS. 1 to 11 in that slidable body 2 does not have an outer extension arranged to overlap a portion of the guide surface of the elongate mounting member.

FIGS. 19 and 20 illustrate a fourth embodiment of a mounting element 101. Inasmuch as mounting element 101 of FIGS. 19 and 20 is similar to mounting element 101 of FIGS. 1 to 11, the afore-detailed description may be applied to mounting element 101 of FIGS. 19 and 20, but for the hereinafter mentioned noticeable differences. An element of mounting element 101 of FIGS. 19 and 20 having a structure or function substantially similar to an element of mounting element 101 of FIGS. 1 to 11 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like mounting element 101 of FIGS. 1 to 11, mounting element 101 of FIGS. 19 and 20 may comprise an elongate mounting member 102, a not shown extension mechanism, and a telescopic extender 1, which are similar to the ones depicted in FIGS. 1 to 11. Telescopic extender 1 may for example comprise a slidable body 2, a locking member 4 having two engagement parts 12 and two resilient parts 14, and a release mechanism 6.

Mounting element 101 of FIGS. 19 and 20 mainly differs from mounting element 101 of FIGS. 1 to 11 in that the locking member 4 has one engagement part 12, instead of two, and one resilient part 14, instead of two. The sole engagement part 12 may be configured to engage the guide surface of elongate mounting member 102. The sole resilient part 14 is connected to engagement part 12 so as to allow engagement part 12 to move elastically.

Further, mounting element 101 of FIGS. 19 and 20 differs from mounting element 101 of FIGS. 1 to 11 in that release mechanism 6 may have only one pushing portion 8, which is configured to reduce the amplitude of the extension of engagement part 12 in a lateral direction when release mechanism 6 is operably moved by a user into the release state.

Besides, mounting element 101 of FIGS. 19 and 20 differs from mounting element 101 of FIGS. 1 to 11 in that the flat spring forming locking member 4 may have a securing portion 4.2 that is inserted in a notch extending in slidable body 2 and that is folded around a portion of slidable body 2, so as to secure locking member 4 to slidable body 2. Thus, mounting element 1 of FIGS. 19 and 20 may be relatively easy to manufacture and to assemble.

FIGS. 21 to 23 illustrate a fifth embodiment of a mounting element 101. Inasmuch as mounting element 101 of FIGS. 21 to 23 is similar to mounting element 101 of FIGS. 1 to 11, the afore-detailed description may be applied to mounting element 101 of FIGS. 21 to 23, but for the hereinafter mentioned noticeable differences. An element of mounting element 101 of FIGS. 21 to 23 having a structure or function substantially similar to an element of mounting element 101 of FIGS. 1 to 11 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like mounting element 101 of FIGS. 1 to 11, mounting element 101 of FIGS. 21 to 23 may comprise an elongate mounting member 102, a not shown extension mechanism, and a telescopic extender 1, which are similar to the ones depicted in FIGS. 1 to 11. Telescopic extender 1 may for example comprise a slidable body 2, a locking member 4 having two engagement parts 12 and two resilient parts 14, a release mechanism 6, and a stopping portion 16.

Mounting element 101 of FIGS. 21 to 23 mainly differs from mounting element 101 of FIGS. 1 to 11 in that release mechanism 6 does not have any rotatable pushing portion. Further, mounting element 1 of FIGS. 21 to 23 differs from mounting element 101 of FIGS. 1 to 11 in that a central portion of locking member 4 may be displaced with respect to slidable body 2 between i) the lock state and ii) the release state, whereas the central part of locking member 4 of FIGS. 1 to 11 is fixed with respect to slidable body 2. Thus, mounting element 1 of FIGS. 21 to 23 may be comprised of a relatively small number of components. Resilient part 14 of locking member 4 is elastically deformed as it abuts against a receiving surface 2.4 of slidable body 2.

FIGS. 24 to 26 illustrate a mounting device 101 according to a second, independent aspect. Inasmuch as mounting device 101 of FIGS. 24 to 26 is similar to mounting element 101 of FIGS. 1 to 11, the afore-detailed description may be applied to mounting device 101 of FIGS. 24 to 26, but for the hereinafter mentioned noticeable differences. An element of mounting device 101 of FIGS. 24 to 26 having a structure or function substantially similar to an element of mounting element 101 of FIGS. 1 to 11 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like mounting element 101 of FIGS. 1 to 11, mounting device 101 of FIGS. 24 to 26 may comprise an elongate mounting member 102, and a telescopic extender 1, which are similar to the ones depicted in FIGS. 1 to 11. Telescopic extender 1 may for example comprise a slidable body 2, a locking member 4 having two engagement parts 12 and two resilient parts 14, and a release mechanism 6. Locking member 4 may allow telescopic extender 1 to slide in first translation direction X2, but locking member 4 may generate a friction force F14 (FIG. 24) to prevent telescopic extender 1 from sliding in second translation direction OX2. Release mechanism 6 may reduce the amplitude of the extension of engagement part 12 in lateral direction Y2, when release mechanism 6 is in the release state.

Mounting device 101 of FIGS. 24 to 26 mainly differs from mounting element 101 of FIGS. 1 to 11 in that it is configured to mechanically connect, for example splice, an outer elongate mounting member 102.O to an inner elongate mounting member 102.I.

Mounting device 101 of FIGS. 24 to 26 mainly differs from mounting element 101 of FIGS. 1 to 11 in that it does not have an extension mechanism. Telescopic extender 1 of FIGS. 24 to 26 is fully arranged inside the outer elongate mounting members 102.O and partially inside the inner elongate mounting member 102.I, such that telescopic extender 1 does not protrude out of mounting device 101. Telescopic extender 1 is arranged between outer elongate mounting member 102.O and inner elongate mounting member 102.I. Telescopic extender 1 is substantially surrounded by outer elongate mounting member 102.O. Thus, the outer elongate mounting members 102.O and the inner elongate mounting member 102.I may be mechanically connected, for example spliced, by the mounting device 101.

When mounting element 101 is put in service, mounting element 101 may enable the user to easily and finely adjust the overall length of mounting element 101 to the dimension of architectural recess 300. The user may conveniently draw, with only one hand, slidable body 2 outwards and easily select any adjustment position along the continuous displacement of slidable body 2 as allowed by locking member 4. The user may stop slidable body 2, which is then prevented from returning backwards by locking member 4.

The selected adjustment position cannot be unwittingly unsettled. After such easy adjustment, the user may place mounting element 101 in architectural recess 300 and the user may move, with only one hand, extension mechanism 104 from the retracted state (FIGS. 1 and 3) to the extended state (FIGS. 2 and 4).

With respect to the background art devices it has proved easier to quickly adjust and durably maintain the overall length of mounting element 101, in which extension mechanism 104 and telescopic element 1 work in a combined manner at both ends of mounting element 101. It only takes two hands, without any tool nor any help needed from another person, whereas the background art devices would require two persons and/or tools to mount architectural covering 200 in architectural recess 300.

Furthermore, the forces exerted in a combined manner by extension mechanism 104 and telescopic extender 1 are strong enough to retain mounting element 101 in architectural recess 300 durably over time, even with a heavy blind.

The second aspect may form the subject-matter of a claim to patent protection independently from the first object.

Although some exemplary embodiments and aspects have been described above in relation to the exemplary drawings, the present disclosure is not limited to the exemplary embodiments and aspects described above and illustrated in the exemplary drawings wherein the reference numbers are only provided as non-limiting examples. Many changes and alternatives may be made by the skilled person within the scope of the present disclosure, which scope shall not be limited to the appended drawings. The features of the respective exemplary embodiments and aspects may be interchangeably implemented and/or combined in any technically feasible way as long as the resulting subject-matter is covered by the appended claims.

In the foregoing description, it will be appreciated that the phrases “at least one”, “one or more”, and “and/or”, as used herein, are open-ended expressions that are both conjunctive and disjunctive in operation. The term “a” or “an” entity, as used herein, refers to one or more of that entity. As such, the terms “a” (or “an”), “one or more” and “at least one” can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader’s understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

It is to be understood by one of ordinary skill in the art that the present discussion is a description of exemplary embodiments only, and is not intended as limiting the broader aspects of the present disclosure.

All apparatuses and methods discussed in this document are examples of apparatuses and/or methods implemented in accordance with one or more principles of this disclosure. These examples are not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure.

It will be appreciated that although some components are illustrated as separate elements, any two or all three components may be consolidated into an integral element instead.

The or each embodiment illustrated in the figures has several separate and independent features, which each, at least alone, has unique benefits which are desirable for, yet not critical to, the presently disclosed mounting element or device. Therefore, the various separate features described herein need not all be present in order to achieve at least some of the desired characteristics and/or benefits described herein. One or more separate features may be combined, or only one of the various features need be present in a mounting element or device formed in accordance with various principles of the present disclosure. Moreover, throughout the present disclosure, reference numbers are used to indicate a generic element or feature of the disclosed embodiment. The same reference number may be used to indicate elements or features that are not identical in form, shape, structure, etc., yet which provide similar functions or benefits. Additional reference characters (such as letters, as opposed to numbers) may be used to differentiate similar elements or features from one another.

The foregoing description has broad application. It should be appreciated that the concepts disclosed herein may apply to many types of shades, in addition to the shades described and depicted herein. Similarly, it should be appreciated that the concepts disclosed herein may apply to many types of mounting elements or devices, in addition to the mounting element or device 101 described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

While the foregoing description and drawings represent various embodiments, it will be understood that various additions, modifications, and substitutions may be made therein without departing from the spirit and scope of the present disclosure. In particular, it will be clear to those skilled in the art that principles of the present disclosure may be embodied in other forms, structures, arrangements, proportions, and with other elements, materials, and components, without departing from the spirit or essential characteristics thereof. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the invention being indicated by the appended claims, and not limited to the foregoing description.

In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

While a mounting element or device formed in accordance with the principles of the present disclosure is particularly shown and described herein with reference to particular embodiments, it is to be understood that the disclosed embodiments may be used with many additions, substitutions, or modifications of form, structure, arrangement, proportions, materials, and components and otherwise, used in the practice of the disclosure, which are particularly adapted to specific environments and operative requirements without departing from the spirit and scope of the present disclosure. The presently disclosed embodiments are therefore to be considered in all respects as illustrative and not restrictive, the scope of the invention being indicated by the appended claims, and not limited to the foregoing description.

While the foregoing description and drawings represent examples of embodiments of the present subject matter, it will be understood that various additions, modifications, and substitutions may be made therein without departing from the spirit and scope of the present subject matter or the principles thereof. For instance, it will be clear to those skilled in the art that the present subject matter may be embodied in other specific forms, structures, arrangements, proportions, and with other elements, materials, components, and otherwise, such as may be particularly adapted to specific environments and operative requirements, without departing from the spirit or essential characteristics thereof. While the disclosure is presented in terms of embodiments, it should be appreciated that the various separate features of the present subject matter need not all be present in order to achieve at least some of the desired characteristics and/or benefits of the present subject matter or such individual features. It will be appreciated that various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations, and features described with respect to one embodiment typically may be applied to another embodiment, whether or not explicitly indicated. Accordingly, individual features of any embodiment may be used and can be claimed separately or in combination with features of that embodiment or any other embodiment. Moreover, elements shown as integrally formed may be constructed of multiple parts or elements shown as multiple parts may be integrally formed, the operation of elements may be reversed or otherwise varied, the size or dimensions of the elements may be varied. Therefore, the present disclosure is not limited to only the embodiments specifically described herein. The presently disclosed embodiments are therefore to be considered in all respects as illustrative and not restrictive, the scope of the claimed subject matter being indicated by the appended claims, and not limited to the foregoing description.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

The invention claimed is:

1. A mounting element, for mounting an architectural covering between two opposing mounting surfaces, the mounting element comprising:

an elongate mounting member which is elongated along a longitudinal direction and which has a first end, a second end, and opposed first and second guide surfaces extending in the longitudinal direction, and a telescopic extender arranged at one of the first end or the second end of the elongate mounting member, the telescopic extender being operable between a retracted configuration and an extended configuration so as to abut one of the opposing mounting surfaces when the mounting element is mounted between the opposing mounting surfaces, and wherein the telescopic extender comprises:

a slidable body configured to slide along the first and second guide surfaces parallel to the longitudinal direction in a first translation direction away from the first end so as to lengthen the mounting element, a locking member mechanically coupled to the slidable body, the locking member including opposed first and second engagement parts that are independently movable relative to each other to selectively engage the first and second guide surfaces, respectively, the locking member being configured such that: i) the slidable body is allowed to slide in the first translation direction when the locking member is unlocked, and ii) the slidable body is prevented from sliding in a second translation direction opposite the first translation direction when the first and second engagement parts are engaged with the first and second guide surfaces, respectively, and a release mechanism mechanically coupled to the slidable body, the release mechanism including first and second pushing portions spaced apart from one another, the first and second pushing portions being rotatable to displace the first and second engagement parts, respectively, relative to the elongate mounting member.

2. The mounting element according to claim 1, wherein the release mechanism is mechanically operable between a lock state and a release state, the release mechanism being configured to cooperate with the locking member such that:

i) the locking member prevents the slidable body from sliding in the second translation direction when the release mechanism is in the lock state, and ii) the slidable body is allowed to slide in the second translation direction when the release mechanism is in the release state.

3. The mounting element according to claim 2, wherein the first and second pushing portions are configured to displace the first and second engagement parts, respectively, of the locking member when the release mechanism is operated between the lock state and the release state.

4. The mounting element according to claim 1, wherein the release mechanism is configured to be actuated by a manual force.

5. The mounting element according to claim 1, wherein the first pushing portion comprises a first cam that is rotatable with respect to the slidable body to displace the first engagement part of the locking member and wherein the second pushing portion comprises a second cam that is rotatable with respect to the slidable body to display the second engagement part of the locking member.

6. The mounting element according to claim 1, wherein the first and second engagement parts extend at least in a lateral direction crossing the first and the second translation directions.

7. The mounting element according to claim 1, wherein the locking member further comprises at least one resilient part, the at least one resilient part configured to be elastically deformed by the release mechanism so as to change an amplitude of a dimension of at least one of the first engagement part or the second engagement part in the lateral direction.

8. The mounting element according to claim 7, wherein the release mechanism is configured to deform the at least one resilient part so as to reduce the amplitude of the dimension of the at least one of the first or the second engagement part in the lateral direction when the release mechanism is in the release state.

9. The mounting element according to claim 1, wherein the locking member is comprised of a resilient material.

10. The mounting element according to claim 1, wherein the locking member is located at an end of the slidable body which is oriented towards the first end of the mounting element.

11. The mounting element according to claim 1, wherein the first and second guide surfaces comprise opposed first and second sidewalls of the elongate mounting member, the elongate mounting member further comprising a wall connecting the first and second sidewalls.

12. The mounting element according to claim 11, wherein the first and second guide surfaces are made with a friction-promoting material or are coated with the friction-promoting material, and wherein the first and second engagement parts of the locking member are made of a complementary friction-promoting material or are coated with the complementary friction-promoting material.

13. The mounting element according to claim 1, wherein the telescopic extender further comprises an abutment device configured to abut the other one of the opposing mounting surfaces, and wherein the mounting element further comprises a holding part that is configured to hold an end of the architectural covering.

14. The mounting element according to claim 1, wherein the locking member is movable between: i) a first state at which the first and second engagement parts are disengaged from the first and second guide surfaces, respectively, to allow the slidable body to slide in the first translation direction, and ii) a second state at which the first and second engagement parts are engaged the first and second guide surfaces, respectively, so as to prevent the slidable body from sliding in the second translation direction.

15. The mounting element according to claim 1, wherein the first and second pushing portions are configured to be rotated independent of each other.

16. The mounting element according to claim 1, wherein the first and second pushing portions are configured to be rotated simultaneously with each other.

17. An architectural covering assembly, comprising an architectural covering for covering an architectural recess, wherein the architectural covering assembly includes the mounting element according to claim 1.

18. A mounting element, for mounting an architectural covering between two opposing mounting surfaces, the mounting element comprising:

an elongate mounting member which is elongated along a longitudinal direction and which has a first end, a second end, and at least one guide surface, and a telescopic extender arranged at one of the first end or the second end of the elongate mounting member, the telescopic extender being operable between a retracted configuration and an extended configuration so as to abut one of the opposing mounting surfaces when the mounting element is mounted between the opposing mounting surfaces, and wherein the telescopic extender comprises:

a slidable body configured to slide along the at least one guide surface parallel to the longitudinal direction in a first translation direction away from the first end so as to lengthen the mounting element, a locking member mechanically coupled to the slidable body, the locking member being configured: i) to allow the slidable body to slide in the first translation direction, and ii) to engage the at least one guide surface so as to prevent the slidable body from sliding in a second translation direction opposite the first translation direction, and a release mechanism including a cam that is rotatable relative to the slidable body between a lock state and a release state, the release mechanism being configured to cooperate with the locking member such that:

i) the locking member prevents the slidable body from sliding in the second translation direction when the cam is in the lock state, and ii) the slidable body is allowed to slide in the second translation direction when the cam is in the release state.

19. The mounting element according to claim 18, wherein the locking member is movable via rotation of the cam between: i) a first state at which the locking member is disengaged from the at least one guide surface to allow the slidable body to slide in the first translation direction, and ii) a second state at which the locking member engages the at least one guide surface so as to prevent the slidable body from sliding in the second translation direction.

20. The mounting element according to claim 18, wherein the locking member comprises an engagement part configured to be selectively engaged with the at least one guide surface and a resilient part coupled to the engagement part, the resilient part being configured to be elastically deformed by the release mechanism so as to change an amplitude of a dimension of the engagement part in the lateral direction.

21. The mounting element according to claim 18, wherein:

the at least one guide surface includes opposed first and second guide surfaces extending in the longitudinal direction;

the slidable body is positioned between the first and second guide surfaces; and the locking member includes opposed first and second engagement parts configured to selectively engage the first and second guide surfaces, respectively.

* * * * *